Figure 1:
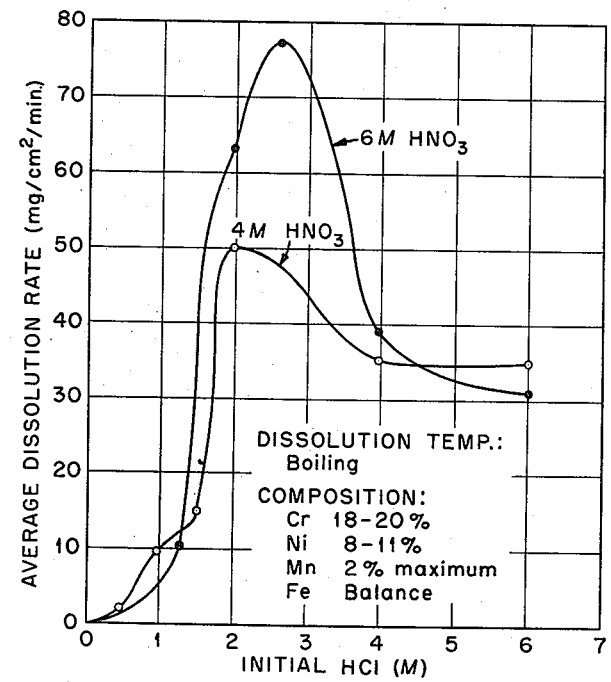

INVENTORS
Marshall L. Hyman
Jouko E. Savolainen

INVENTORS
Marshall L. Hyman
Jouko E. Savolainen
BY
ATTORNEY

United States Patent Office 2,919,972
Patented Jan. 5, 1960

2,919,972

REMOVAL OF CHLORIDE FROM AQUEOUS SOLUTIONS

Marshall L. Hyman and Jouko E. Savolainen, Oak Ridge, Tenn., assignors to the United States of America as represented by the United States Atomic Energy Commission Application June 5, 1957, Serial No. 663,858

3 Claims. (Cl. 23—14.5)

Our invention relates to methods for the removal of chlorides from aqueous solutions and more particularly to methods for removing and recovering chlorides from acidic aqueous solutions which result from processing neutronic reactor fuel elements.

In many cases it is necessary to remove chlorides from acidic aqueous solutions in order to eliminate chloride corrosion, particularly when the aqueous solution is to be in contact with stainless steel. In addition, it is desirable to recover the removed chloride, particularly when a chloride is being used in a step in the process. The step of removing chlorides from aqueous solutions is required in several processes which have been developed for the processing of neutronic reactor fuel elements.

Fuel elements for relatively high-power neutronic reactors, which necessarily operate at high temperatures must have incorporated into their structure materials which not only have suitable nuclear and mechanical properties but also are able to withstand the corrosive effects of the solutions used in those reactors. Materials which have proved to be particularly suitable in this respect include zirconium, stainless steel, molybdenum, and niobium. However, most of such materials are not only corrosion-resistant in the respective gaseous or liquid atmospheres in a reactor, but are also corrosion-resistant in simple dissolution media. For instance, nitric acid is ineffective as a practical dissolving agent for those materials and dissolution media which are more corrosive must be used.

We have found that mixtures of nitric acid and hydrochloric acid are excellent dissolution agents for fuel elements containing oxidation-resistant alloys such as stainless steel, alloys of nickel and chromium and other chromium-containing alloys. Other chloride-containing fluids may be used in dissolving other oxidation-resistant materials such as zirconium, niobium, and molybdenum and alloys containing those metals. The chloride ions in the resulting solutions are extremely corrosive to conventional equipment such as that made of stainless steel. If the chlorides are removed immediately after the dissolution step, chloride corrosion in subsequent process steps is eliminated, and materials which are not inert to the chloride, such as stainless steel, may be used in equipment for those steps.

It is therefore an object of our invention to provide a process for the removal of chlorides from aqueous solutions.

Another object of our invention is to provide an economical process for recovering metal values from relatively inert materials wherein a mixture of hydrochloric and nitric acids is used as the dissolution medium.

Another object of our invention is to provide a process for recovering metal values from relatively inert materials using a mixture of hydrochloric and nitric acids as a dissolution medium wherein a relatively small amount of the process equipment is in contact with the chlorides.

Still another object is to provide a process for the separation, recovery and recycle of chlorides from acidic aqueous solutions used to dissolve relatively inert reactor fuel elements.

Other objects and advantages of our invention will be apparent to those skilled in the art from the following description and the claims appended hereto.

In accordance with our invention chloride values may be removed from an aqueous solution containing same together with extraneous impurities by contacting said solution with concentrated nitric acid while said solution is maintained at an elevated temperature, and removing the resultant chloride-containing vapors from the remaining acidic aqueous solution.

By the use of our invention chloride ions may be removed from an aqueous solution containing chlorides, leaving a substantially chloride-free solution of nitrate salts. Chloride ions present in an aqueous solution may be removed from said solution until as little as 20 p.p.m. of chloride remain and the chloride ions which are particularly corrosive to metals such as stainless steels are not present in significant quantities in subsequent process steps. Consequently a mixture of nitric and hydrochloric acids as well as other chloride-containing fluids may be used to dissolve oxidation-resistant materials while keeping the amount of chloride-corrosion-resistant process equipment to a minimum.

In one method of using our invention the material from which metal values is to be recovered is dissolved in a mixture of hydrochloric and nitric acids. The acid concentration to be used in the dissolution step is not critical, and may be determined by considerations such as the desired dissolution rate and the desired chloride concentration in the resulting solution. We have found that while the usual aqua regia (one volume of 16 molar nitric acid plus four volumes of 12 molar hydrochloric acid) may be used, such high concentrations of acid lead to excessive reaction rates, excessively high chloride content of the resulting solution, and excessive gas formation from mutual decomposition of the concentrated acid mixture. We have found more dilute solutions to be preferable, and have found that for chromium-containing alloys an unexpectedly optimum rate of dissolution occurs with an acidic solution approximately 2 to 2.5 molar in hydrochloric acid and approximately 4 to 6 molar in nitric acid. A concentration of acids within that range gives a high dissolution rate, yet only a small portion of the acids is decomposed. Fig. 1 clearly shows the increased dissolution rate of a typical stainless steel at hydrochloric acid concentrations approaching 2 molar, and the increased rate of dissolution as the concentration of nitric acid is increased.

The resulting acidic aqueous solution containing dissolved metal values is contacted with concentrated nitric acid. While chlorides may be removed from the solution at any total concentration of acid in the solution it is preferred that the hydrogen ion concentration be from approximately 3 molar to 6 molar. Below a hydrogen ion concentration of approximately 3 molar the volatility of the nitric acid exceeds the volatility of the hydrochloric acid and thus the amount of nitric acid used in the chloride separation step increases with a decrease in hydrogen ion concentration. Although the effectiveness of the separation increases with an increase in hydrogen ion concentration, above a concentration of approximately 6 molar the nitric and hydrochloric acids react with each other and mutually decompose with the formation of volatile gaseous products. The formation of these gases is undesirable if the chlorides and nitrates are to be recovered since it is more difficult to recover such volatile decomposition products than to recover the chlorides and nitrates as the acids.

Figure 2:
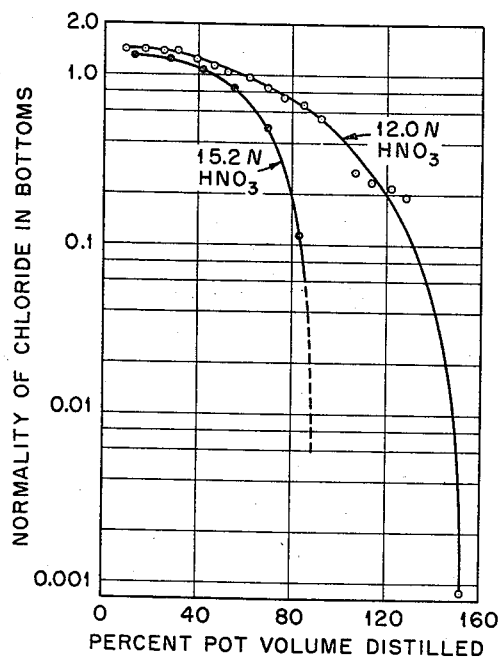

In using our process chlorides can be removed from aqueous solutions with nitric acid feed concentrations above approximately 5 molar, but concentrations above approximately 8 molar are preferred and we have found that the use of the maximum boiling azeotropic mixture of nitric acid and water (approximately 15.2 molar) is strikingly effective. Fig. 2 dramatically illustrates the effectiveness in chloride removal in batch distillation of increasing the concentration of nitric acid from 12 molar to 15.2 molar.

After the chloride-containing solution is contacted with the concentrated nitric acid, the resulting substantially chloride-free acidic solution is ready for additional processing. Uranium values present may be recovered by methods such as the solvent extraction process described in the co-pending application of the common assignee Ser. No. 303,691, filed August 11, 1952, in the names of Thomas C. Runion, William B. Lanham, Jr., and Charles V. Ellison for Process for Segregation of Plutonium, Uranium, and Fission Product Values.

While our invention may be used without recycling the acids, we prefer to recover the chloride and nitric acid mixture and reuse this mixture in the dissolution step. The acid recovery may be achieved by conventional means such as by absorption in an aqueous phase.

An conventional equipment which is resistant to the acidic aqueous solutions which are to be in contact with that equipment may be used in our process. We have found that titanium, tantalum, and glassed-steel equipment are suitable for processing solutions containing relatively high concentrations of chloride ions while other material such as stainless steel may be used for equipment which is in contact with substantially chloride-free acidic aqueous solutions.

In using our invention either a batch process or a continuous process may be used. In a batch process the chloride-containing solution may be placed in a suitable vessel and concentrated nitric acid added while the solution is maintained at its boiling point. The concentrated nitric acid may be introduced as a vapor, or it may be added as a liquid to the chloride-containing solution.

Figure 3:
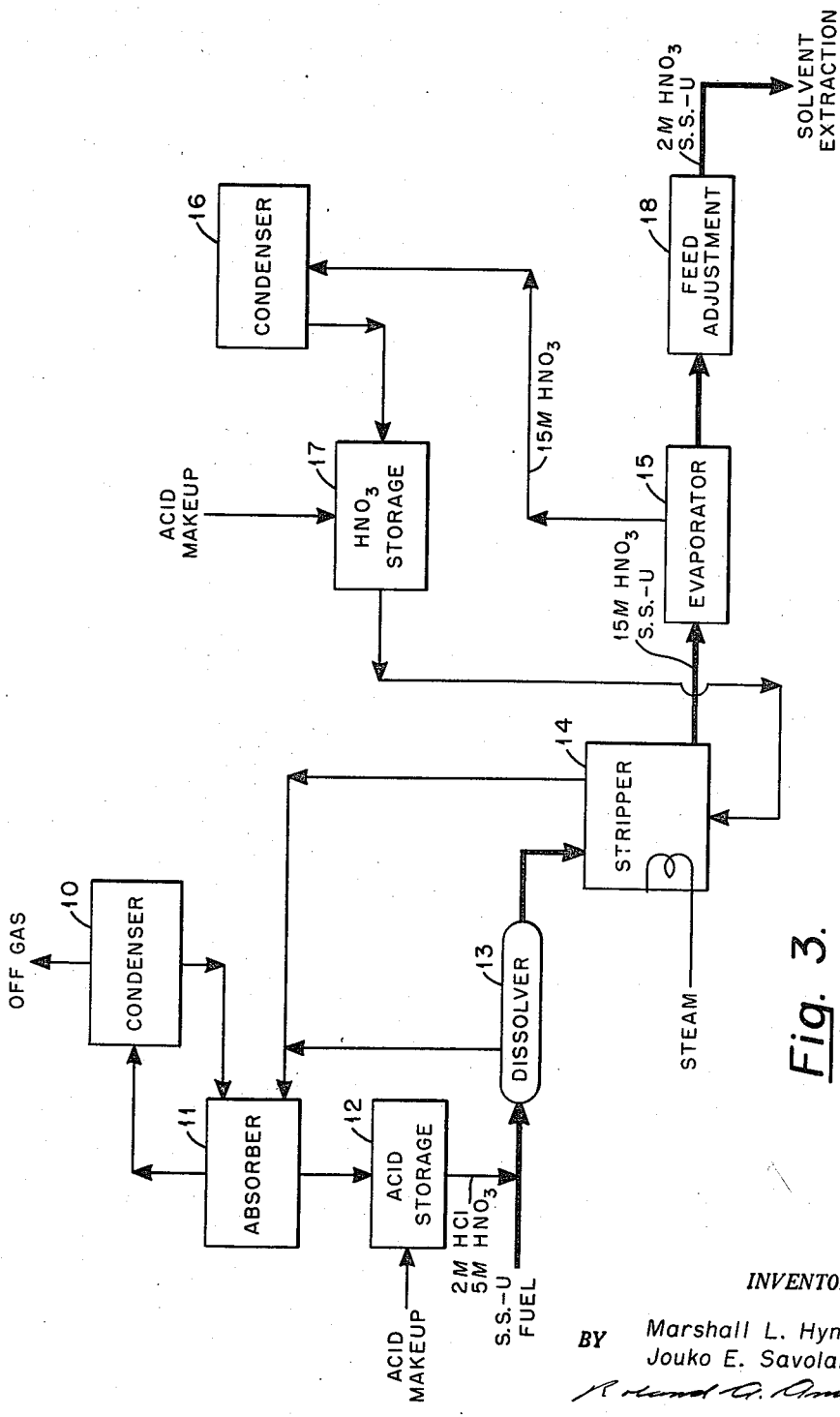

In further explaining our invention, reference will be made to Fig. 3 which shows schematically a typical continous process using our invention. As shown in Fig. 3, stainless steel-uranium fuel elements are fed into the dissolver 13 where they are contacted with a mixture of hydrochoric and nitric acids. The resulting solution is transferred to a stripper 14. Concentrated nitric acid is fed from vessel 17 to the stripper where it is vaporized and contacted with the acidic aqueous chloride-containing solution. The chlorides in the form of hydrochloric acid and a portion of the nitric acid as well as water vapor and products of decomposition are removed as gases from the upper portion of the stripper 14, pass to the absorber 11 and the unabsorbed gases pass to the condenser 10. The absorbed and condensed acids are returned to the dissolver 13 after any necessary make-up acids are added.

The substantially chloride-free acidic aqueous solution containing the dissolved uranium and associated impurities is passed to an evaporator 15 where most of the nitric acid is removed by evaporation. The concentrated nitric acid which is removed is recovered in condenser 16 and transferred to the acid storage vessel 17. The uranium-containing residue in the evaporator 15 is transferred to the feed adjustment vessel 18, where the pH and the ion concentrations of the solution are adjusted in such a manner that the resulting solution is suitable for solvent extraction of the uranium.

The following example illustrates our invention in greater detail.

*Example I*

A sample of a stainless steel, uranium fuel element was dissolved in a 2 molar hydrochloric acid-5 molar nitric acid mixture according to the process shown in Fig. 1. The resulting solution contained 70–85 grams per liter of dissolved fuel element, and the chloride concentration was 1.5–2 molar. The chloride was stripped from the solution by passing countercurrent to 15.2 molar nitric acid. The overhead gases were recovered in an absorber. The stripped solution had a chloride content of 20 p.p.m., which was low enough for processing in conventional stainless steel solvent extraction equipment.

It should be understood that the above example is merely illustrative and should not be construed as limiting the scope of our invention. Although our invention has been specifically illustrated with respect to a chloride-containing solution resulting from the dissolution of stainless steel-uranium fuel elements, it may suitably be applied to chloride-containing solutions resulting from the dissolution of other types of fuel elements such as those containing zirconium, niobium, and molybdenum, and to fuel elements containing uranium as the pure metal, as an alloy, or dispersed in a matrix. It may also be applied to thorium-bearing fuel elements and may be used to remove chlorides from any other aqueous chloride-containing solution. Our invention should, therefore, be limited only as is indicated by the appended claims.

Having thus described our invention, we claim the following:

1. In a process for recovering uranium values from neutronic reactor fuel elements wherein the uranium is intimately associated with a relatively inert chromium-containing alloy, the improvement which comprises contacting said fuel elements with an aqueous solution of nitric acid and hydrochloric acid, said solution being approximately 2–2.5 molar in hydrochloric acid and 4–6 molar in nitric acid, contacting the resulting uranium-bearing solution with concentrated nitric acid vapors while maintaining said solution at an elevated temperature and at a hydrogen ion concentration of from 3 to 6 molar, whereby chloride values are removed from said solution, and recovering uranium values from the remaining, substantially chloride-free solution.

2. The process of claim 1 wherein the concentrated nitric acid vapors are obtained by vaporizing an aqueous nitric acid solution approximately 15.2 molar in nitric acid.

3. In a process for recovering uranium values from neutronic reactor fuel elements wherein the uranium is intimately associated with a chromium-containing alloy, the improvement which comprises contacting said fuel element with an aqueous solution of 4 to 6 molar nitric acid and 2.0 to 2.5 molar hydrochloric acid, passing concentrated nitric acid vapors through the resulting uranium-bearing solution while maintaining said solution at an elevated temperature, and at a hydrogen ion concentration of from 3 to 6 molar whereby hydrochloric acid is removed from said solution as a vapor, leaving a substantially chloride-free uranium-bearing solution, condensing said removed hydrochloric acid, recycling said condensed hydrochloric acid to dissolve additional fuel elements, evaporating the greater portion of nitric acid from the substantially chloride-free uranium-bearing solution, recovering uranium values from the resulting solution, and condensing and recycling the evaporated nitric acid.

References Cited in the file of this patent

UNITED STATES PATENTS 2,241,613     Pauling  ---------------- May 13, 1941

OTHER REFERENCES

Katz et al.: "The Chemistry of Uranium," National Nuclear Energy Series, McGraw-Hill Book Co., N.Y. (1951), pp. 168, 169.

Glasstone: "Principles of Nuclear Reactor Engineering," D. Van Nostrand, N.Y. (1955), pp. 423, 424, 430–432.

"International Conference of the Peaceful Uses of Atomic Energy," United Nations Publication, N.Y. (1955), vol. 8, page 118.